United States Patent
Varada et al.

(10) Patent No.: US 12,140,434 B2
(45) Date of Patent: Nov. 12, 2024

(54) NAVIGATION ASSISTANCE DEVICE

(71) Applicant: International Business Machines Corporation, Armonk, NY (US)

(72) Inventors: Sri Harsha Varada, Vizianagaram (IN); Hemant Kumar Sivaswamy, Pune (IN); Venkata Vara Prasad Karri, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 17/482,612

(22) Filed: Sep. 23, 2021

(65) Prior Publication Data

US 2023/0089413 A1    Mar. 23, 2023

(51) Int. Cl.
*G01C 21/20*    (2006.01)
*H04L 41/16*    (2022.01)
*H04L 67/12*    (2022.01)

(52) U.S. Cl.
CPC ............ *G01C 21/206* (2013.01); *H04L 41/16* (2013.01); *H04L 67/12* (2013.01)

(58) Field of Classification Search
CPC ......... H04M 2250/12; H04M 1/72457; H04W 4/80; H04W 4/029; H04W 4/02; H04W 12/68
See application file for complete search history.

(56) References Cited

U.S. PATENT DOCUMENTS

| | | | |
|---|---|---|---|
| 2016/0179198 A1* | 6/2016 | Levesque | G06F 1/163 340/407.1 |
| 2016/0179199 A1* | 6/2016 | Levesque | G06F 3/016 340/407.2 |
| 2016/0372007 A1 | 12/2016 | Cervantes | |
| 2018/0066953 A1 | 3/2018 | Kimia | |
| 2020/0364884 A1* | 11/2020 | Trim | G01S 19/42 |
| 2021/0243386 A1* | 8/2021 | Park | H04N 5/2628 |
| 2022/0164494 A1* | 5/2022 | Thompson | G01N 17/006 |

FOREIGN PATENT DOCUMENTS

CN    110582741 A  *  12/2019  ............. G06F 3/011

OTHER PUBLICATIONS

Anonymous. "How Does an Electronic Nose Work?" Printed Jul. 27, 2021. 11 pages. Published by ElProCus. https://www.elprocus.com/electronic-nose-work/.
(Continued)

*Primary Examiner* — Khalid W Shaheed
(74) *Attorney, Agent, or Firm* — Andre Adkins

(57) ABSTRACT

A processor may receive first sensor data associated with detected movement of a user in an environment. The processor may determine, using an AI model, based on the first sensor data, that the movement of the user is associated with a first object. The processor may retrieve sensory data associated with the first object from a repository. In some embodiments, the sensory data may include at least one of auditory, olfactory, and haptic data associated with historical user interactions with the first object. The processor may provide a first sensory signal to the user to indicate a location of the first object relative to a first location of the user.

20 Claims, 5 Drawing Sheets

(56) References Cited

OTHER PUBLICATIONS

Aron, Jacob. "Glasses emit personal sound and smell." Published Nov. 30, 2011. 2 pages. Published by New Scientist. https://www.newscientist.com/article/mg21228415-800-glasses-emit-personal-sound-and-smell/.

Bai, et al., "Smart Guiding Glasses for Visually Impaired People in Indoor Environment." Published Nov. 13, 2017. 9 pages. Published in IEEE Transactions on Consumer Electronics. https://arxiv.org/ftp/arxiv/papers/1709/1709.09359.pdf.

Elgendy, et al., "Making Shopping Easy for People with Visual Impairment Using Mobile Assistive Technologies." Published Mar. 13, 2019. 15 pages. In Appl. Sci. 2019, 9, 1061. Published by MDPI. https://archive.hshsl.umaryland.edu/handle/10713/10229.

Kim, et al., "Hand Grip Pattern Recognition for Mobile User Interfaces." Published in 2006. 6 pages. Published by American Association for Artificial Intelligence. https://www.aaai.org/Papers/AAAI/2006/AAAI06-296.pdf.

Kulyukin, et al., "Accessible Shopping Systems for Blind and Visually Impaired Individuals: Design Requirements and the State of the Art." Published Nov. 16, 2010. 11 pages. In The Open Rehabilitation Journal, 2010, 3, pp. 158-168. Published by Bentham Open. https://www.semanticscholar.org/paper/Accessible-Shopping-Systems-for-Blind-and-Visually-Kulyukin-Kutiyanawala/8f875fa53ad304bb00e919a00d4b51c731234e1d?p2df.

Mell, et al., "The NIST Definition of Cloud Computing," Recommendations of the National Institute of Standards and Technology, U.S. Department of Commerce, Special Publication 800-145, Sep. 2011, 7 pgs.

Nicholson, et al., "ShopTalk: Independent Blind Shopping Through Verbal Route Directions and Barcode Scans." Published in 2009. 13 pages. In The Open Rehabilitation Journal, 2009, 2, pp. 11-23. Published by Bentham Open. https://core.ac.uk/download/pdf/21750698.pdf.

Parry, Wynne. "'Digital smell' technology could let us transmit odors in online chats." Published Nov. 27, 2018. 9 pages. Published by NBC News. https://www.nbcnews.com/mach/science/digital-smell-technology-could-let-us-transmit-odors-online-chats-ncna940121.

Winner, Cherie. "Device helps visually impaired 'see' groceries." Published May 28, 2015. 11 pages. Published by Futurity. https://www.futurity.org/visually-impaired-grocery-stores-technology-929382/.

Zientara, et al., "A Multitask Grocery Assistance System for the Visually Impaired." Published Dec. 14, 2016. 9 pages. In IEEE Consumer Electronics Magazine 6(1):73-81. Published by Research Gate. https://www.researchgate.net/.

\* cited by examiner

NAVIGATION ASSISTANCE DEVICE

BACKGROUND

The present disclosure relates generally to the field of navigation assistance, and more specifically to providing a sensory signal to a user to assist the user in navigating with respect to an object.

Evidence indicated that when the brain is deprived of input in one sensory modality, it is capable of reorganizing itself to support and augment other senses, a phenomenon known as cross-modal neuroplasticity. For example, visually impaired individuals may have strong hearing and smelling capability.

SUMMARY

Embodiments of the present disclosure include a method, computer program product, and system for providing a sensory signal to a user to assist the user in navigating with respect to an object. A processor may receive first sensor data associated with detected movement of a user in an environment. The processor may determine, using an AI model, based on the first sensor data, that the movement of the user is associated with a first object. The processor may retrieve sensory data associated with the first object from a repository. In some embodiments, the sensory data may include at least one of auditory, olfactory, and haptic data associated with historical user interactions with the first object. The processor may provide a first sensory signal to the user to indicate a location of the first object relative to a first location of the user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
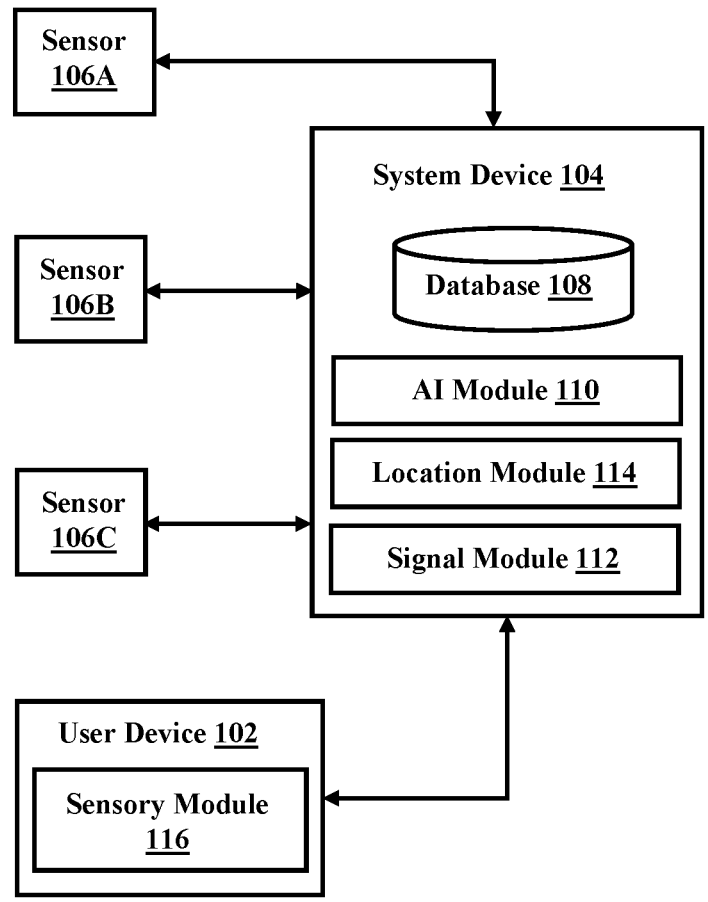
FIG. 1 is a block diagram of an exemplary system for providing a sensory signal to a user, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of navigation assistance, and more specifically to providing a sensory signal to a user to assist the user in navigating with respect to an object. While the present disclosure is not necessarily limited to such applications, various aspects of the disclosure may be appreciated through a discussion of various examples using this context.

In some embodiments, a processor may receive first sensor data associated with detected movement of a user in an environment. For example, the user may be in an environment that is new to the user. A movement of the user may be detected by internet-of-things ("IoT") sensors that monitor the user in an environment. The detected movement of the user in the environment may include movement of the user from one position or location to another and/or movement of any part of the body of the user (e.g., hands, heads, arms, torso). In some embodiments, the detected movement may include movement of the face of user, including changes in facial expression. In some embodiments, the detected movement may include various orientations of the user's hands (e.g., grip or gestures using palms and fingers). In some embodiments, the IoT sensors may also observe/detect objects in the environment. For example, the IoT sensors may detect that a user is turning her head from right to left and making a grabbing motion (e.g., closing and opening of fingers and hand) three feet from a shelf of blue jeans in a store.

In some embodiments, the processor may determine, using an artificial intelligence ("AI") model, based on the first sensor data, that that movement of the user is associated with a first object. In some embodiments, movement of the user associated with the first object may include that the movement of the user is indicative of the user searching for the first object, that the movement of the user is indicative of a desire of the user to navigate with respect to (e.g., towards, around, away from) the first object (e.g., a desire to direct appendages away from a hot object), etc.

In some embodiments, the processor may use the AI model to ascertain from the sensor data that the user is searching for something or desiring to navigate with respect to an object. In some embodiments, the processor may use the AI model to ascertain what the user is searching for/navigating with respect to from the sensor data. In some embodiments, the AI model may be trained using historical data regarding the movement of the user (e.g., body movement, facial expression, grip of the hand) when she is searching for (or navigating with respect to) an object or using an object. In some embodiments, the historical data may include data obtained during a training period from the user where interactions of the user with objects are observed and the movements of the user when using or searching for the objects are identified.

In some embodiments, the AI model may be trained to identify that the movement of a user is indicative of the user looking for something (e.g., physical movements, gestures). In some embodiments, the AI model may be trained to identify that the user is looking for something (or navigating with respect to something) based on movements of one or more users in relation to (e.g., in proximity to, near, towards, around) an object.

In some embodiments, the AI model may be trained to identify the object (e.g., a key bunch, cup of coffee, or pair of blue jeans in the environment). In some embodiments, the historical data may include data associated with the object that is used for identification of the object. For example, the historical data may include image data through which the object may be identified (e.g., using image recognition techniques). In some embodiments, identification of the object may include identification of characteristics of the object, including dimensions, shape, materials (e.g., porcelain cup vs. plastic cup), temperature, etc. In some embodiments, the historical data may be gathered using IoT sensors located in an environment.

In some embodiments, the historical data may include at least one of auditory, olfactory, and/or haptic data associated with the interactions of one or more users with the one or more objects (e.g., smell associated with a cup of coffee). In some embodiments, the historical data may include haptic data associated with a touch sensation associated with touching a particular item (e.g., knit blanket rather than a plastic tablecloth). In some embodiments, the historical data may relate to sounds associated with the placement of an object on a surface (e.g., ceramic coffee cup on a wooden table rather than on a plastic, metal, or stone table).

In some embodiments, the AI model may be a classification AI model, including, for example, decision trees, K-nearest neighbors, deep neural networks, etc.

In some embodiments, the processor may retrieve sensory data associated with the first object from a repository. In some embodiments, the sensory data may include auditory, olfactory, or haptic data associated with the historical user interactions with the first object. For example, the sensory data may include the sound made when a user touches the ridged fabric on a pair of jeans, the touch sensation produced by the ridged and rough fabric of the jeans, the smell of coffee, the sound made when a cup of coffee is placed on a table, the warmth felt when touching the exterior of a coffee cup, etc. In some embodiments, the historical use may be the historical use of the current user or the historical use of other users from whom data was used to initially train the AI model.

In some embodiments, the processor may provide a first sensory signal to the user to indicate a location of the first object relative to a first location of the user. For example, the user may have a wearable device (e.g., pair of smart glasses, a smartwatch, etc.) that has components/interfaces to provide sensory (e.g., auditory, olfactory, or haptic) stimuli to user (e.g., a glove for haptic stimuli, a speaker for auditory, and an olfactory machine for providing olfactory stimuli). In some embodiments, the wearable device may provide a sound in a right earpiece to signal to go right and a sound in the left earpiece to signal to go left.

In some embodiments, determining that that movement of the user is associated with a first object may include identifying that the detected movement meets a similarity threshold in comparison to historical movement of the user associated with a searching behavior of the user. For example, user behavior involving turning the head to the right, then to left, and then right again, may be classified by the AI model as associated with searching behavior of the user. If the use is detected making this movement in a new environment, the AI model may identify that the movement of the user is associated with the first object (e.g., the user is searching for the first object). In some embodiments, this classification may involve the detected movement being compared to the historical movement with which the AI model was trained to determine if a similarity threshold was reached or exceeded (e.g., the movement of the user is 90% similar to an historical movement).

In some embodiments, determining that movement of the user is associated with a first object may include identifying from the first sensor data that the first object meets a similarity threshold in comparison to one or more objects with which the user historically interacted. For example, a user may be identified as moving in a manner associated with searching behavior of the user. Additionally, the eyeglasses of the user may be detected on a shelf of the clothing store. The identification that the movement of the user is associated with a first object may include identifying that the glasses detected on the clothing store shelf meets a similarity threshold in comparison to the eyeglasses with which the user historically interacted (e.g., at her home during the training phase personalizing the method of this disclosure to the user).

In some embodiments, determining that movement of the user is associated with a first object may include identifying that the detected movement meets a similarity threshold in comparison to historical data associated with user interactions with one or more objects. Continuing the previous example, the user may make (e.g., historically) a particular hand movement and grip when reaching for her eyeglasses. If the user is detected making that particular hand movement and grip (or a similar hand movement and grip) when in the clothing store, the AI model may classify that the user is searching for or navigating with respect to her eyeglasses. In some embodiments, the classification may be based on the detected movement of the user in the store compared to the historical movement of the user meeting or exceeding a similarity threshold value.

In some embodiments, the processor may receive second sensor data associated with the movement of the user in the environment. In some embodiments, the processor may identify a second location of the user. In some embodiments, the processor may identify the location of the first object relative to the second location of the user. In some embodiments, the processor may provide a second sensory signal to the user based on the location of the first object relative to the second location of the user. In some embodiments, more than one signal may be provided to the user as the user changes location with respect to the first object.

In some embodiments, the second sensory signal may have a different proximity factor than the first sensory signal. In some embodiments, the proximity factor may be an attribute of the first and second sensory signals that varies based on the proximity of the user to the first object. For example, as a user gets closer to the first object, the signals may have greater frequency, louder, higher in pitch, of greater intensity (e.g., stronger smell of coffee), etc.

In some embodiments, the first sensory signal may be selected based on the identity of the first object. For example, if the first object is a cup of coffee, the olfactory signal sent to the user may smell like coffee, and if the first object is a cup of hot chocolate, the olfactory signal sent to the user may smell like hot chocolate. In some embodiments, the sound, smell, or haptic sensation provided to the user may be selected based on the historical knowledge of the sounds, smells, or haptic sensations provided by the first object (e.g., texture of blue jeans, sound of a key bunch jingling, smell of the leather material of a wallet). In some embodiments, the sensory signal(s) provided may indicate a direction for which the object(s) are located. For instance, a user may wear wrist bands with haptic sensors on either of their wrists, and if an object is to the left of the user, the band on the left wrist of the user may output a haptic response to indicate to the user that the object is to the left.

Referring now to FIG. 1, a block diagram of a system 100 for providing a sensory signal to a user is illustrated. System 100 includes a user device 102, a system device 104, and IoT sensors 106A-C. The user device 102 and sensors 106A-C are configured to be in communication with the system device 104. The system device 104 includes a database 108, an AI module 110, a signal module 112, and a location module 114. In some embodiments, the user device 102 and the system device 104 may be any devices that contain a processor configured to perform one or more of the functions or steps described in this disclosure.

In some embodiments, sensors 106A-C obtain sensor data associated with the movement of a user in an environment. The sensor data is sent to system device 104, stored in database 108, and used by the AI module 110 to identify that the user is searching for a first object (not illustrated) in the environment. The signal module 112 retrieves sensory data associated with the first object from the database 108 of the system device 104. The location of the first object relative to a first location of the user is determined from data collected by IoT sensors 106A-C by location module 114. The signal module 112 then provides a first sensory signal to user device 102 to indicate a location of the first object relative to a first location of the user. The first sensory signal is provided to the user via the sensory module 116. In some embodiments, the sensory module 116 may include a smell generation device. In some embodiments, the sensory module 116 may include a haptic interface in, on, or proximate to the user device 102 or external to the user device 102 (e.g., a haptic glove) that provides a haptic sensory signal to the user.

In some embodiments, the system device 104 may use the captured IoT sensor data to identify that the user is in a new environment. In some embodiments, the system device 104 may interface with/communication with a computing device of the new environment (e.g., connect to the Wi-Fi of a store) to obtain information regarding the location of various items/object (e.g., products being sold) in the new environment (e.g., the new environment is a smart environment).

As the user moves in the environment, the IoT sensors 106A-C may obtain second sensor data associated with the movement of the user in the environment. The sensor data may be used by the location module 114 of the system device 104 to identify the second location of the user and identify the location of the first object relative to the second location of the user. The signal module 112 may then provide a second sensory signal to the user device 102 based on the location of the first object relative to the second location of the user.

The user device 102 has a signal module 112 through which the sensory signals (e.g., haptic, olfactory, or auditory) are selected to be provided to the sensory module 116 of the user device 102. The sensory signals are calibrated to navigate the user to, around, or with respect to the first object. For example, the first sensory signal may be selected based on the cardinal direction from the user to the first object. In some embodiments, the second sensory signal may have a different proximity factor than the first signal to indicate a difference in the location of the first object relative to the first location of the user compared to the location of the first object relative to the second location of the user. The proximity factors are tuned to correctly navigate the user to the correct location.

In some embodiments, the AI module 110 may identify that the movement of the user is associated with a first object by identifying that the detected movement meets a similarity threshold in comparison to historical movement of the user associated with searching behavior of the user. In some embodiments, the AI module 110 may identify that the movement of the user is associated with a first object by identifying from the first sensor data that the first object meets a similarity threshold in comparison to one or more objects with which the user historically interacted. In some embodiments, the AI module 110 may that the movement of the user is associated with a first object by identifying that the detected movement meets a similarity threshold in comparison to historical data associated with user interactions with one or more objects.

In some embodiments, the system device 104 is utilized to personalize the navigation assistance provided to the user. During an initial setup phase, the user device 102 and system device 104 may be utilized in an environment with a sensor data feed to train the system device 104 (its AI module 110 and signal module 112). During this personalization phase, the system device may receive sensor data to identify each object the user interacts with and associate the sounds, smells, or other sensory data with the user's interactions with those objects. This data may help the AI module 110 identify how a user interacts with an object, how a user recognizes the object, how the user behaves when searching for the object, how the user behaves when navigating around an object, etc.

Figure 2:
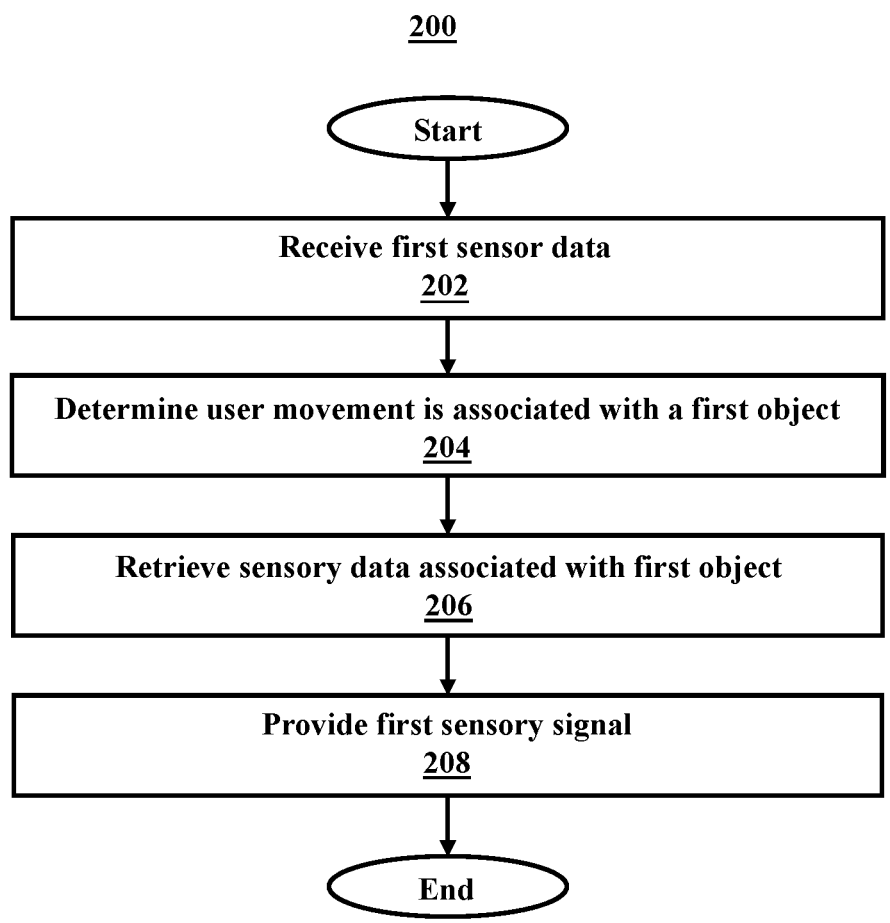
FIG. 2 is a flowchart of an exemplary method system for providing a sensory signal to a user, in accordance with aspects of the present disclosure.

Referring now to FIG. 2, illustrated is a flowchart of an exemplary method 200 for providing a sensory signal to a user, in accordance with embodiments of the present disclosure. In some embodiments, a processor of a system may perform the operations of the method 200. In some embodiments, method 200 begins at operation 202. At operation 202, the processor receives first sensor data associated with detected movement of a user in an environment. In some embodiments, method 200 proceeds to operation 204, where the processor identifies, using an AI model, based on the first sensor data, that the movement of the user is associated with a first object. In some embodiments, method 200 proceeds to operation 206. At operation 206, the processor retrieves sensory data associated with the first object from a repository. In some embodiments, method 200 proceeds to operation 208. At operation 208, the processor provides a first sensory signal to the user to indicate a location of the first object relative to a first location of the user.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
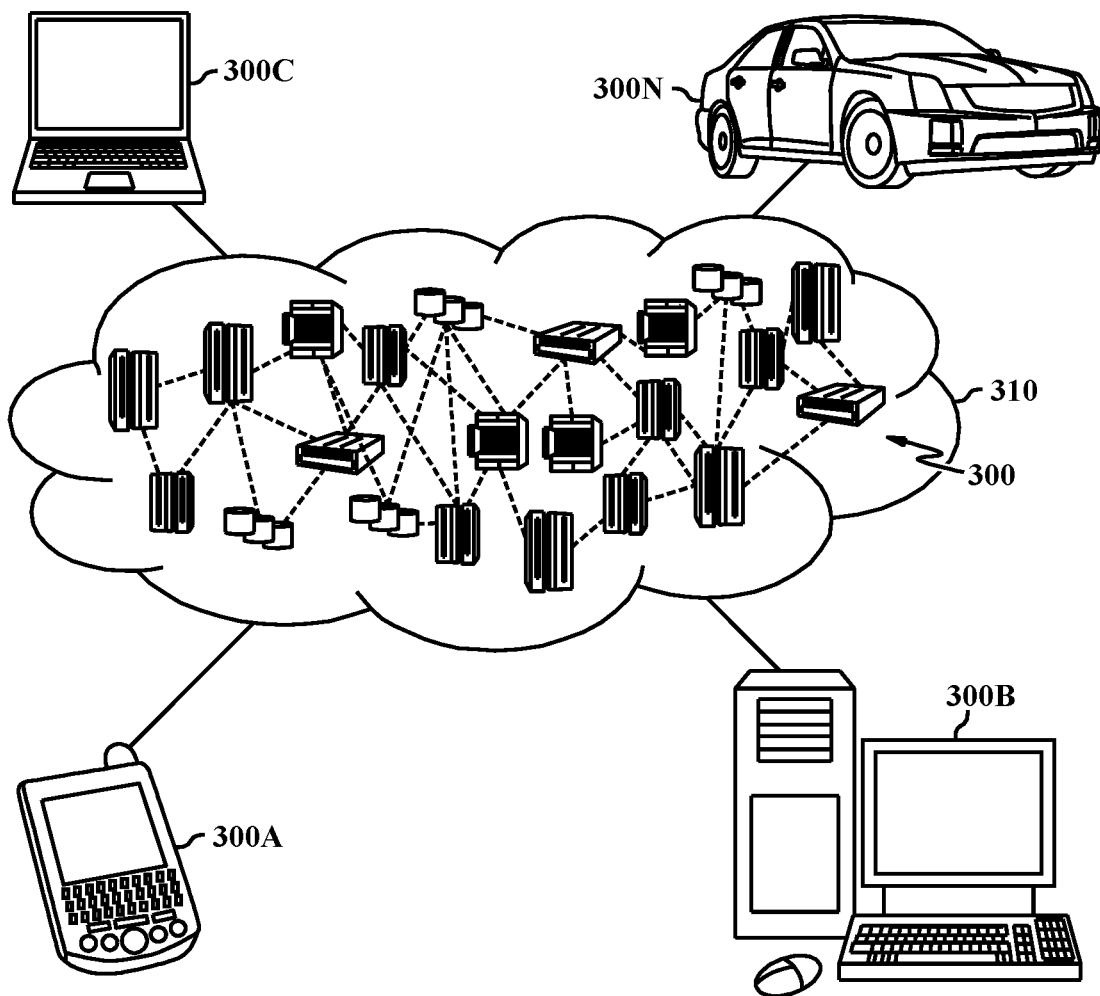
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
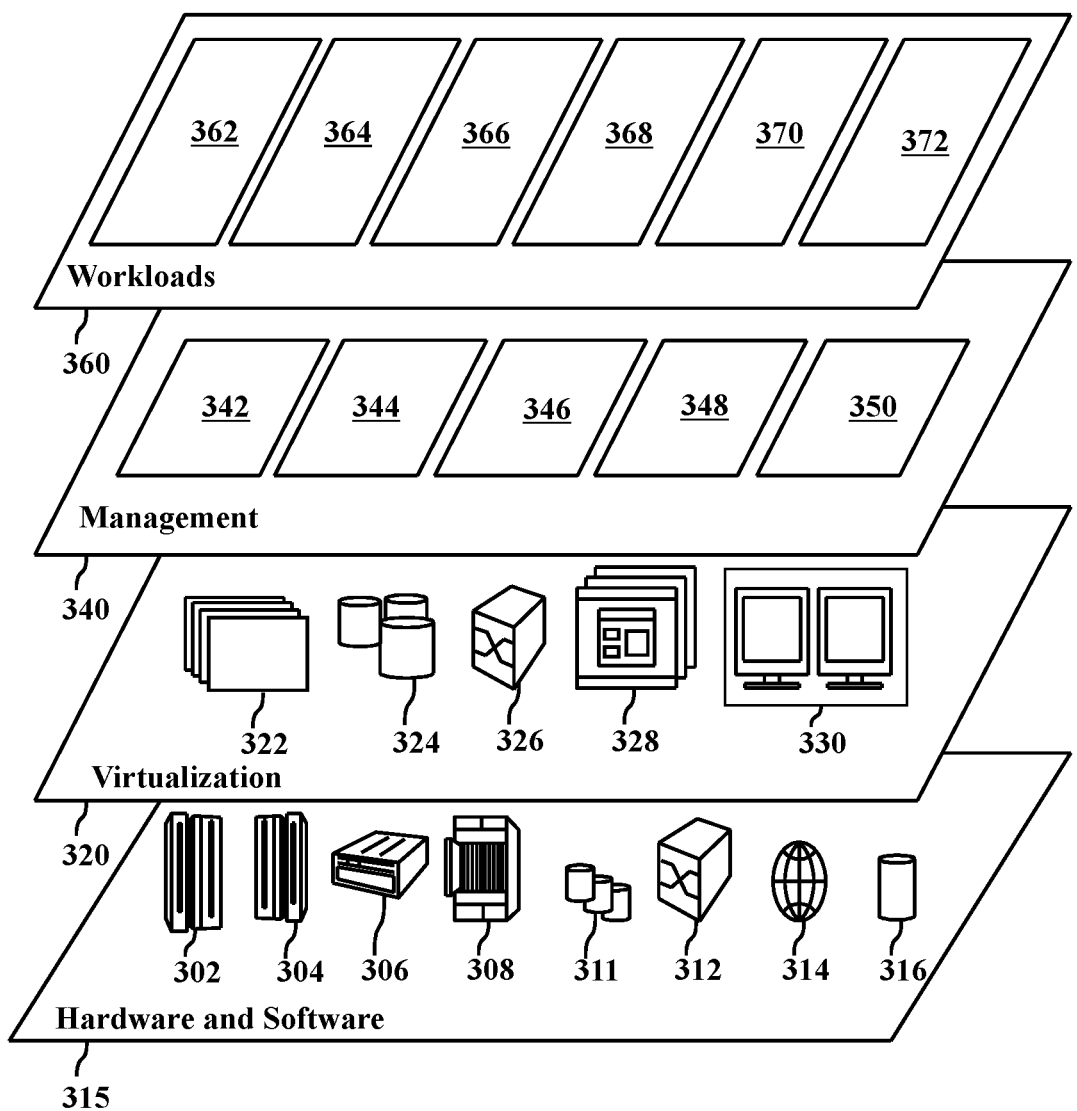
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and providing a sensory signal to a user 372.

Figure 4:
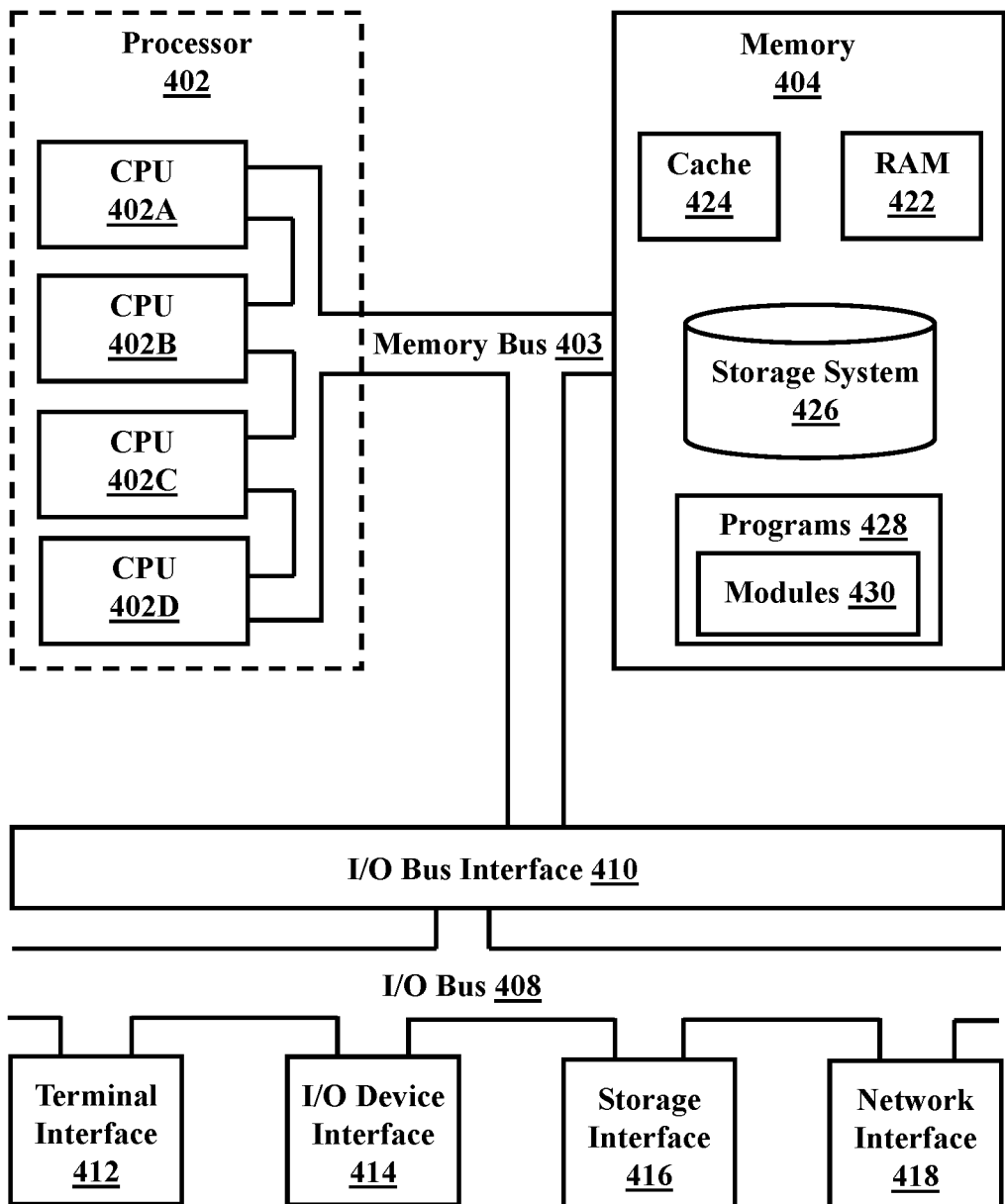
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method, the method comprising:

receiving, by a processor, first sensor data associated with detected movement of a user in an environment;

determining, using an artificial intelligence (AI) model, based on the first sensor data, that the movement of the user is associated with a first object and that identified characteristics of the first object comprise at least one of dimension, shape, material composition or temperature;

wherein the determination is based on the movement meeting a similarity threshold in comparison to a historical movement of the user that is associated with a searching behavior;

retrieving sensory data associated with the first object from a repository and from Internet of Things (IoT) sensors located in the environment, wherein the sensory data includes at least one of auditory, olfactory, and haptic data associated with historical user interactions with the first object; and providing a first sensory signal to the user to indicate a location of the first object relative to a first location of the user and the identified characteristics.

2. The method of claim 1, wherein determining that the movement of the user is associated with the first object comprises:

identifying that the movement meets a similarity threshold in comparison to a historical movement of the user that is associated with a searching behavior of the user for the first object.

3. The method of claim 1, wherein determining that the movement of the user is associated with the first object comprises:

identifying, from the first sensor data, that the first object meets a similarity threshold in comparison to one or more objects with which the user historically interacted.

4. The method of claim 1, wherein determining that the movement of the user is associated with the first object comprises:

identifying that the movement meets a similarity threshold in comparison to historical data associated with user interactions with one or more objects.

5. The method of claim 1, further comprising:

receiving second sensor data associated with the movement of the user in the environment;

identifying a second location of the user;

identifying the location of the first object relative to the second location of the user; and providing a second sensory signal to the user based on the location of the first object relative to the second location of the user.

6. The method of claim 5, wherein the first sensory signal has a first proximity factor, and wherein the second sensory signal has a different proximity factor than the first sensory signal, wherein the different proximity factor indicates a difference in the location of the first object from the location of the second object, relative to the user.

7. The method of claim 1, wherein the first sensory signal is selected based on the identity of the first object.

8. A system comprising:

a memory; and a processor in communication with the memory, the processor being configured to perform operations comprising:

receiving first sensor data associated with detected movement of a user in an environment;

determining, using an artificial intelligence (AI) model, based on the first sensor data, that the movement of the user is associated with a first object and that identified characteristics of the first object comprise at least one of dimension, shape, material composition or temperature;

wherein the determination is based on the movement meeting a similarity threshold in comparison to a historical movement of the user that is associated with a searching behavior;

retrieving sensory data associated with the first object from a repository and from Internet of Things (IoT) sensors located in the environment, wherein the sensory data includes at least one of auditory, olfactory, and haptic data associated with historical user interactions with the first object; and providing a first sensory signal to the user to indicate a location of the first object relative to a first location of the user and the identified characteristics.

9. The system of claim 8, wherein determining that the movement of the user is associated with the first object comprises:

identifying that the detected movement meets a similarity threshold in comparison to a historical movement of the user that is associated with a searching behavior of the user for the first object.

10. The system of claim 8, wherein determining that the movement of the user is associated with the first object comprises:

identifying, from the first sensor data, that the first object meets a similarity threshold in comparison to one or more objects with which the user historically interacted.

11. The system of claim 8, wherein determining that the movement of the user is associated with the first object further comprises:

identifying that the detected movement meets a similarity threshold in comparison to historical data associated with user interactions with one or more objects.

12. The system of claim 8, the processor being configured to perform further operations comprising:

receiving second sensor data associated with the movement of the user in the environment;

identifying a second location of the user;

identifying the location of the first object relative to the second location of the user; and providing a second sensory signal to the user based on the location of the first object relative to the second location of the user.

13. The system of claim 12, wherein the first sensory signal has a first proximity factor, and wherein the second sensory signal has a different proximity factor than the first sensory signal, wherein the different proximity factor indicates a difference in the location of the first object from the location of the second object, relative to the user.

14. The system of claim 8, wherein the first sensory signal is selected based on the identity of the first object.

15. A computer program product comprising a computer readable storage medium having program instructions embodied therewith, the program instructions executable by a processor to cause the processor to perform operations, the operations comprising:

receiving first sensor data associated with detected movement of a user in an environment;

determining, using an artificial intelligence (AI) model, based on the first sensor data, that the movement of the user is associated with a first object and that identified characteristics of the first object comprise at least one of dimension, shape, material composition or temperature;

wherein the determination is based on the movement meeting a similarity threshold in comparison to a historical movement of the user that is associated with a searching behavior;

retrieving sensory data associated with the first object from a repository and from Internet of Things (IoT) sensors located in the environment, wherein the sensory data includes at least one of auditory, olfactory, and haptic data associated with historical user interactions with the first object; and providing a first sensory signal to the user to indicate a location of the first object relative to a first location of the user and the identified characteristics.

16. The computer program product of claim 15, wherein determining that the movement of the user is associated with the first object comprises:

identifying that the detected movement meets a similarity threshold in comparison to a historical movement of the user that is associated with a searching behavior of the user for the first object.

17. The computer program product of claim 15, wherein determining that the movement of the user is associated with the first object comprises:

identifying, from the first sensor data, that the first object meets a similarity threshold in comparison to one or more objects with which the user historically interacted.

18. The computer program product of claim 15, wherein determining that the movement of the user is associated with the first object further comprises:

identifying that the detected movement meets a similarity threshold in comparison to historical data associated with user interactions with one or more objects.

19. The computer program product of claim 15, the processor being configured to perform further operations comprising:

receiving second sensor data associated with the movement of the user in the environment;

identifying a second location of the user;

identifying the location of the first object relative to the second location of the user; and providing a second sensory signal to the user based on the location of the first object relative to the second location of the user.

20. The computer program product of claim 19, wherein the second sensory signal has a different proximity factor than the first sensory signal, wherein the different proximity factor indicates a difference in the location of the first object from the location of the second object, relative to the user.

* * * * *